United States Patent
Bhalla

(10) Patent No.: US 10,136,244 B2
(45) Date of Patent: Nov. 20, 2018

(54) EXTENDING CONNECTIVITY IN A MACHINE TO MACHINE COMMUNICATION SYSTEM

(71) Applicant: ZTE Corporation, Shenzhen (CN)

(72) Inventor: Rajesh Bhalla, Gahanna, OH (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/118,074

(22) PCT Filed: Feb. 10, 2015

(86) PCT No.: PCT/US2015/015280
§ 371 (c)(1),
(2) Date: Aug. 10, 2016

(87) PCT Pub. No.: WO2015/120480
PCT Pub. Date: Aug. 13, 2015

(65) Prior Publication Data
US 2016/0360340 A1   Dec. 8, 2016

Related U.S. Application Data

(60) Provisional application No. 61/938,122, filed on Feb. 10, 2014.

(51) Int. Cl.
*H04W 4/00* (2018.01)
*H04L 29/08* (2006.01)
(Continued)

(52) U.S. Cl.
CPC ............ *H04W 4/005* (2013.01); *H04L 67/16* (2013.01); *H04L 69/08* (2013.01); *H04W 4/70* (2018.02); *H04L 61/6022* (2013.01)

(58) Field of Classification Search
CPC .... H04L 12/66; H04L 41/0226; H04W 4/005; H04W 84/18
See application file for complete search history.

(56) References Cited

U.S. PATENT DOCUMENTS

2011/0213871 A1   9/2011   DiGirolamo et al.
2012/0296968 A1   11/2012  Lin et al.
(Continued)

FOREIGN PATENT DOCUMENTS

WO   2013/073747 A1   5/2013
WO   2013/074849 A1   5/2013
(Continued)

OTHER PUBLICATIONS

"Machine-to-Machine communications (M2M); Functional architecture," ETSI TS 102 690 v2.1.1, Technical Specification, 332 pages, Oct. 2013.
(Continued)

*Primary Examiner* — Raj Jain
(74) *Attorney, Agent, or Firm* — Perkins Coie LLP

(57) ABSTRACT

In a machine to machine (M2M) communication system, a common service entity hosts a registration for a remotely hosted application entity, stores a point of access address corresponding to the remotely hosted application entity, and thereby facilitates M2M communication between the remotely hosted application entity and another M2M node. The communication may be performed over the Mca interface.

18 Claims, 6 Drawing Sheets

(51) Int. Cl.
*H04L 29/06* (2006.01)
*H04W 4/70* (2018.01)
*H04L 29/12* (2006.01)

(56) References Cited

U.S. PATENT DOCUMENTS

| | | |
|---|---|---|
| 2013/0003609 A1 | 1/2013 | Ballot et al. |
| 2013/0013793 A1 | 1/2013 | Sanchez Herrero |
| 2013/0016657 A1 | 1/2013 | Muhanna et al. |
| 2013/0060664 A1* | 3/2013 | Macrae ............ G06F 17/30864 |
| | | 705/26.81 |
| 2013/0094444 A1 | 4/2013 | Lai et al. |
| 2013/0103842 A1 | 4/2013 | Seed et al. |
| 2013/0157673 A1 | 6/2013 | Brusilovsky |
| 2013/0188515 A1 | 7/2013 | Pinheiro et al. |
| 2013/0203412 A1 | 8/2013 | Starsinic et al. |
| 2013/0250968 A1 | 9/2013 | Zhou et al. |
| 2013/0332627 A1 | 12/2013 | Skog et al. |
| 2013/0343538 A1 | 12/2013 | Mizikovsky et al. |
| 2013/0346504 A1 | 12/2013 | Huang et al. |
| 2014/0086144 A1 | 3/2014 | Foti et al. |
| 2015/0264634 A1 | 9/2015 | Ding et al. |
| 2015/0350904 A1* | 12/2015 | Kim ...................... H04L 41/082 |
| | | 455/411 |
| 2015/0358874 A1* | 12/2015 | Ahn ........................ H04L 12/66 |
| | | 370/331 |
| 2016/0359797 A1 | 12/2016 | Bhalla |
| 2016/0360340 A1* | 12/2016 | Bhalla ..................... H04L 67/16 |
| 2016/0366716 A1 | 12/2016 | Bhalla |
| 2017/0026774 A1 | 1/2017 | Koshimizu et al. |

FOREIGN PATENT DOCUMENTS

| | | |
|---|---|---|
| WO | 2013/171722 A2 | 11/2013 |
| WO | 2013/190402 A1 | 12/2013 |
| WO | 2015/120477 A1 | 8/2015 |
| WO | 2015/120484 A1 | 8/2015 |

OTHER PUBLICATIONS

3GPP TSG SA WG2 Meeting #78, "Device triggering and E.164 MSISDN replacement," TD S2-101169, San Francisco, California, USA, pp. 1-4, Feb. 2010.

Bhalla, R., "Discussions on Triggering Aspects in oneM2M," oneM2M Input Contribution, oneM2M Partners, Doc# ARC-2014-0125—Discussion on Triggering Aspects in oneM2M, pp. 1-13, Feb. 2014.

Bhalla, R., "M2M-Node-ID attribute for non-CSE Capable AEs," oneM2M Input Contribution, oneM2M Partners, Doc# ARC-2014-0126-M2M—Node-ID for non-CSE capable Entities, pp. 1-5, Feb. 2014.

Bhalla, R., "pointOfAccess attribute for non-CSE Capable AEs," oneM2M Input Contribution, oneM2M Partners, Doc# ARC-2014-0123—pointOfAccess for AEs on non-CSE capable Entities, pp. 1-5, Feb. 2014.

Bhalla, R., "Some Enhancements for Supporting Device Triggering," oneM2M Input Contribution, oneM2M Partners, Doc# ARC-2014-0127—some enhancements for supporting device triggering, pp. 1-4, Feb. 2014.

Bhalla, R., "Underlying Network Identifier," oneM2M Input Contribution, oneM2M Partners, Doc# Arc-2014-0124—Underlying Network Identifier, pp. 1-3, Feb. 2014.

Bhalla, R., et al., "Application Port ID," oneM2M Input Contribution, oneM2M Partners, Doc# ARC-2014-1179—Application_Port_ID.Doc, pp. 1-8, Feb. 2014.

European Extended Search Report dated Feb. 2, 2017 for European Patent Application No. 15746113.8, filed on Feb. 10, 2015 (8 pages).

European Extended Search Report dated Feb. 2, 2017 for European Patent Application No. 15747056.8, filed on Feb. 10, 2015 (10 pages).

European Extended Search Report dated Feb. 6, 2017 for European Patent Application No. 15747005.5, filed on Feb. 10, 2015 (12 pages).

Foti, G., et al., "Functional architecture in oneM2M-TS-0001 oneM2M Functional Architecture—V-0.01," oneM2M Input Contribution, oneM2M Partners, Doc# oneM2M-Arc-2013-0347, pp. 1-3, Jul. 2013.

International Search Report and Written Opinion dated Apr. 28, 2015 for International Application No. PCT/US2015/015287, filed on Feb. 10, 2015 (10 pages).

International Search Report and Written Opinion dated Apr. 28, 2015 for International Application No. PCT/US2015/015274, filed on Feb. 10, 2015 (11 pages).

International Search Report and Written Opinion dated Apr. 28, 2015 for International Application No. PCT/US2015/015280, filed Feb. 10, 2015 (7 pages).

Jacobs, P., et al., "WI 0002—onem2m Architecture; Technical Specification—M2M Architecture," oneM2M Partners, pp. 1-4, Dec. 2013, Retrieved from the Internet <URL:http://ftp.onem2m.org/meetings/ARC/2013-meetings/20131209_ARC8.0_Miyazaki/oneM2M-ARC-2013-0509R04-Revision_of figure_6-1.DOC> [retrieved on Jan. 26, 2017].

Katusic, D., et al., "Universal Identification Scheme in Machine-to-Machine Systems," IEEE Proceedings of the 12th International Conference on Telecommunications (ConTEL 2013), Zagreb, Croatia, pp. 71-78, Jun. 2013.

Kim, S., et al., "Overall Procedure Discussion related to Security," oneM2M Partners, pp. 1-9, Jan. 2014, Retrieved from the Internet <URL:http://ftp.onem2m.org/meetings/SEC/2014 meetings/20140115_SEC-ah/SEC-2014-0008-Overall_Procedure_Discussion_related_to_Security.PPT> [retrieved on Jan. 26, 2017].

Office Action dated Oct. 10, 2017 for Japanese Patent Application No. 2016-551238, filed on Feb. 10, 2015 (9 pages).

Office Action dated Oct. 17, 2017 for Japanese Patent Application No. 2016-551158, filed on Feb. 10, 2015 (5 pages).

Office Action dated Sep. 26, 2017 for Japanese Patent Application No. 2016-551156, filed on Feb. 10, 2015 (4 pages).

OneM2M Technical Specification, "oneM2M Functional Architecture Baseline Draft," oneM2M Partners, Doc# oneM2M TS-0001-V-2014-08, pp. 1-297, Aug. 2014, <URL:http://www.onem2m.org/images/files/deliverables/TS-0001-oneM2M-Functional-Architecture-V-2014-08.pdf>.

OneM2M Technical Specification, "oneM2M Functional Architecture," oneM2M Partners, Doc# oneM2M-TS-0001—V-0.3.2, pp. 1-171, Jan. 2014, <URL:http://ftp.onem2m.org/Meetings/ARC/2014%20meetings/20140109_ARC8.1/ARC-2014-0618R02-Functional_Architecture_Spec_TS-0001_v0_3_2_Draft-Baseline.ZIP>.

OneM2M Technical Specification, "oneM2M Functional Architecture," oneM2M Partners, Doc# oneM2M-TS-0001—V-0A.0, pp. 1-169, Feb. 2014, <URL:http://member.onem2m.org/Application/documentapp/downloadimmediate/default.aspx?docID=4723>.

Yu, J., "How to Name Your M2M Device," Neustar Blog, pp. 1-5, Feb. 2012, Retrieved from the Internet <URL:https://www.neustar.biz/blog/how-to-name-your-m2m-device> [retrieved on Jan. 26, 2017].

* cited by examiner

EXTENDING CONNECTIVITY IN A MACHINE TO MACHINE COMMUNICATION SYSTEM

CROSS REFERENCE TO RELATED APPLICATIONS

This patent document claims the benefit of U.S. Provisional Patent Application No. 61/938,122, filed on Feb. 10, 2014. The entire content of the before-mentioned patent application is incorporated by reference as part of the disclosure of this document.

BACKGROUND

This document relates to machine-to-machine (M2M) communication.

M2M communication generally refers to communication between two different devices, which is not explicitly triggered by a user. Devices may perform M2M communication using wired or wireless connectivity. The communication is typically initiated by an application residing on one of the machine to gather or send information to a counterpart application on the other machine.

SUMMARY

This document describes technologies, among other things, for facilitating communication between M2M devices. Using the disclosed techniques, in some embodiments, application level connectivity can be established between M2M nodes, irrespective of whether or not one of the nodes hosts a common service entity (CSE).

In one aspect, methods, systems and apparatus for facilitating M2M communications include hosting, at a common service entity, a registration for a remotely hosted application entity, storing a point of access address corresponding to the remotely hosted application entity, and facilitating, based on the point of access address, M2M communication between the remotely hosted application entity and another M2M node.

These and other aspects, and their implementations and variations are set forth in the drawings, the description and the claims.

BRIEF DESCRIPTION OF THE DRAWINGS

Like reference symbols in the various drawings indicate like elements.

DETAILED DESCRIPTION

The following abbreviations are used in this document.
ADN: Application Dedicated Node.
ADN-AE: AE which resides in the Application Dedicated Node.
AE: Application Entity.
App: Application.
ASN: Application Service Node.
ASE-AE: Application Entity that is registered with the CSE in the Application Service Node.
ASN-CSE: CSE which resides in the Application Service Node.
BBF: Broadband Forum.
CSE: Common Service Entity.
CSF: Common Service Function.
EF: Enabler Function.
IEEE: Institute of Electrical and Electronics Engineers
IETF: Internet Engineering Task Force
IN: Infrastructure Node.
IN-AE: Application Entity that is registered with the CSE in the Infrastructure Node.
IN-CSE: CSE which resides in the Infrastructure Node.
JNI: Java Native Interface.
LTE: Long Term Evolution.
MAC: Medium Access Control.
M2M: Machine to machine.
MN: Middle Node.
MN-CSE: CSE which resides in the Middle Node.
NSE: Network Service Entity.
SDO: Standards development organization.
UNet: Underlying network (in which an M2M device resides).

In M2M communications, the two endpoints between which communication occurs often are in different networks. In a typical application scenario, one endpoint may be a sensor or a utility box that may go offline for extended time periods and another endpoint may be an application server such as a utility billing server or an M2M server that may be deployed in a managed network. Data packets traveling back and forth between these two end points may be routable via various routing options. For example, one endpoint may have connectivity over a licensed spectrum (e.g., Long Term Evolution) or an unlicensed spectrum (e.g., Wi-Fi). When one endpoint is offline for extended time periods, e.g., days or weeks, the way in which packets were routed to that end point during a last communication session may not necessarily the way in which the packets can be routed in a current communication session. Furthermore, various routing options may incur various costs (e.g., bandwidth charges or power dissipation during transmission).

Figure 1:
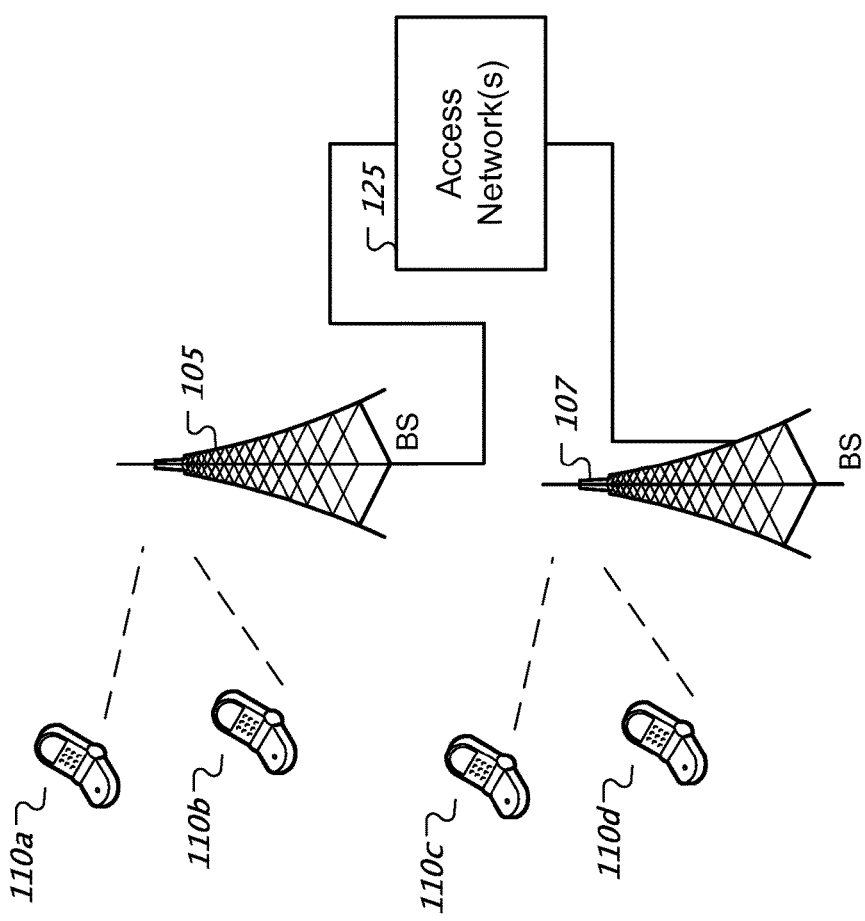
FIG. 1 depicts example wireless network architecture.

FIG. 1 shows an example of a wireless communication network or system. This wireless communication network can include one or more base stations (BSs) 105, 107 and one or more wireless devices 110. A base station 105, 107 can transmit a signal on a forward link (FL), known as a downlink (DL) signal, to one or more wireless devices 110. A wireless device 110 can transmit a signal on a reverse link (RL), known as an uplink (UL) signal, to one or more base stations 105, 107. A wireless communication system can include one or more core networks 125 to control one or more base stations 105, 107. One or more base stations form a radio access network. A base station, due to its nature of providing radio access for a wireless device, either alone or in combination with one or more other base stations, can be referred to as an access point (AP), an access network (AN) or eNodeB. Examples of wireless communication systems that can implement the present techniques and systems include, among others, wireless communication systems based on Code division Multiple Access (CDMA) such as CDMA2000 1x, High Rate Packet Data (HRPD), Long-Term Evolution (LTE), Universal Terrestrial Radio Access Network (UTRAN), and Worldwide Interoperability for Microwave Access (WiMAX).

Figure 2:
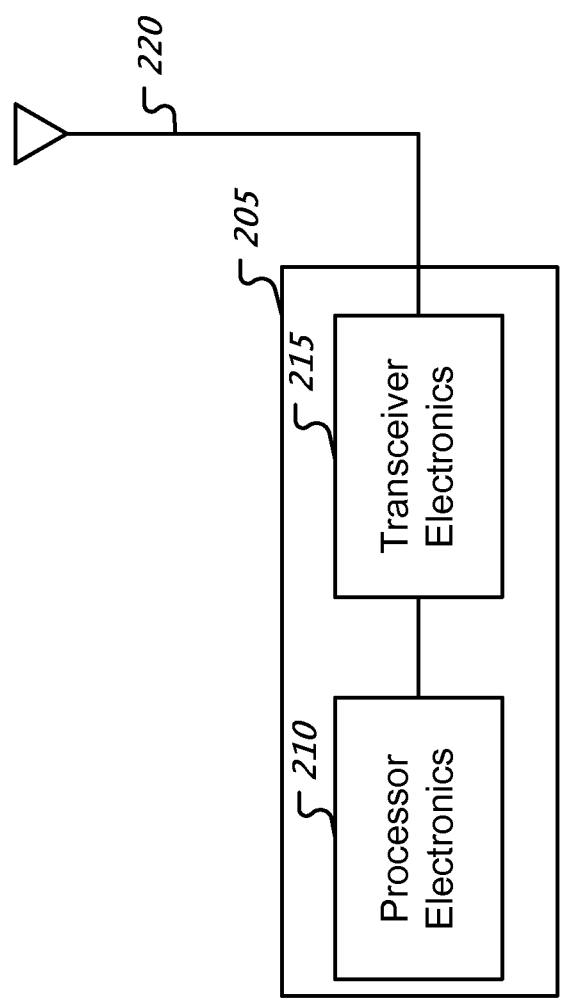
FIG. 2 is a block diagram of a radio device operable in a wireless network.

FIG. 2 shows an example of a radio transceiver station for implementing a wireless device, a base station or other wireless communication modules. Various examples of radio stations include base stations and wireless devices in FIG. 1. A radio station 205 such as a base station or a wireless device can include processor electronics 210 such as a microprocessor that implements methods such as one or more of the techniques presented in this document. A radio station 205 can include transceiver electronics 215 to send and/or receive wireless signals over one or more communication interfaces such as one or more antennas 220. A radio station 205 can include other communication interfaces for transmitting and receiving data. In some implementations, a radio station 205 can include one or more wired communication interfaces to communicate with a wired network. A radio station 205 can include one or more memories 225 configured to store information such as data and/or instructions. In some implementations, processor electronics 210 can include at least a portion of transceiver electronics 215 and a memory 225.

In some implementations, radio stations 205 can communicate with each other based on a CDMA or GSM based air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA2000 1x, HRPD, WiMAX, GSM, LTE, and Universal Mobile Telecommunications System (UMTS).

In some implementations, a radio station 205 may additionally be configured with a local area network connectivity such as a 802.11 (a/b/g/n) interface. The availability of such an interface may make it possible to communicatively couple the radio station 205 to the Internet via the local area connection. For example, a user may access services over her user equipment (UE) by connecting to the service via a wireless local area network connection (e.g., home Wi-Fi access) through a fixed broadband network such as a cable modem network or a DSL network. The above described radio station 205 may be used to implement techniques disclosed in the present document, e.g., may represent an M2M node.

Service Layer specifications developed by organizations such as oneM2M, ETSI TC M2M, TIA TR-50 etc. (M2M SDOs) need to support efficient deployment of M2M Solutions by a wide range of market-focused (vertical) organizations. With the focus on the Service Layer, such organizations have been taking transport network-independent view of the end-to-end services. Yet, they need to make sure that their Service Layer specifications can be used effectively for interfacing with different types of transport networks. Such transport networks include but are not limited to the wireless and wireline networks being defined by 3GPP, 3GPP2, IEEE, IETF and BBF.

Some M2M systems provide for a CSE to facilitate communication among application level entities. However, not all entities/nodes are required to hosts CSE.

A CSE is an instantiation of one or more CSFs. A CSE provides a subset of CSFs that could be used and shared by M2M Applications. A CSE can utilize UNet capabilities and can interact with other CSEs to fulfil the service. A CSE comprises the set of "service functions" that are common to the M2M environments. Such service functions are exposed to other entities through Reference Points such as the Mca and Mcc reference points specified in oneM2M (see FIG. 3). The Mcc reference point defines communication flows between CSEs. The reference point Mcn is used for accessing Underlying Network Service Entities. Examples of service functions offered by CSE are: Data Management, Device Management, M2M Subscription Management, Location Services etc. Such "subfunctions" offered by a CSE may be logically apprehended as Common Services Functions (CSFs). Inside a Common Services Entity (CSE), some of the CSFs can be mandatory and others can be optional. Also, inside a CSF, some subfunctions can be mandatory or optional (e.g., inside a "Device Management" CSF, some of the subfunctions like "Application Software Installation", "Firmware Updates", "Logging", "Monitoring", etc. can be mandatory or optional).

A CSF is a set of service functions that are common to the M2M environment and specified by an interworking specification such as oneM2M.

As an example, in a oneM2M system, for entities/nodes that do not host CSEs (such as ADNs, Node-less-AEs), and when they register with a node that is CSE-capable, the registration results in the creation of an <application> resource at the CSE-capable Node. The reachability information for the AE provided in such <application> resource is presently limited to App-Inst-ID (Application Instance ID) only. In some embodiments, App-Inst-ID may not be sufficient for communication between a CSE and an AE that is located at a remote entity/node. A remote entity/node may be an entity/node that is not local, i.e., may have to be reached across a network communication path. Stated differently, no "pointOfAccess" information may be available for such registering-AE. With such lack of "pointOfAccess," a remotely hosted AE cannot be reached over Mca reference point.

Using the disclosed techniques, in some embodiments, an address, such as IP address, MAC address etc. can be made available at the CSE that hosts registration for remotely hosted AE. Such address is termed as a "pointOfAccess" resource attribute in oneM2M. Such "pointOfAccess" can be included in the <application> resource for the remotely hosted CSE. An example pointOfAccess 402 listing is depicted in the <application> listing 400 of FIG. 4.

Resource Type Application

Figure 4:
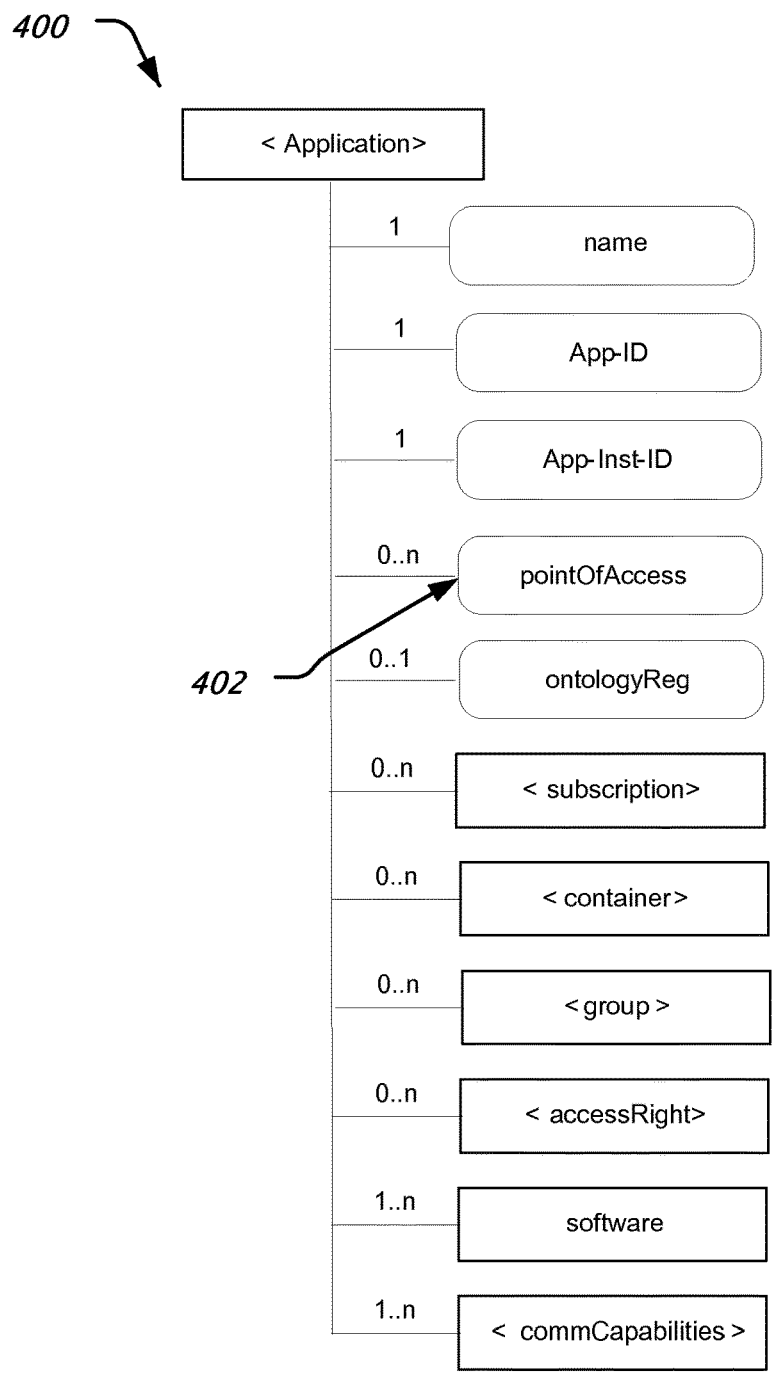
FIG. 4 shows an example of attributes of an Application resource.

The <application> resource represents information about an Application Entity known to a given Common Services Entity. FIG. 4 depicts an example 400 of application resource.

This resource may contain the child resources according to their multiplicity in Table 1 (0 indicates the optionality of the child resource). The term "multiplicity" refers to the number of independent instances of the resource that are available in an implementation.

TABLE 1

| Child Resource Name of <Application> | Child Resource Type | Multiplicity | Description |
|---|---|---|---|
| [variable] | <subscription> | 0 ... n | |
| [variable] | <container> | 0 ... n | |
| [variable] | <group> | 0 ... n | |
| [variable] | <accessRight> | 0 ... n | |
| software__[i] | <mgmtObj> | 1 ... n | This resource represents the software component (or components, if the multiplicity is greater than 1) that compose the application. This mgmtObj shall have at least the following <parameters> child resources of its "parameters" subresource: name (multiplicity 1) version (multiplicity 1) state (multiplicity 1) |
| [variable] | <commCapabilities> | 1 ... n | This resource describes the communication capabilities (essentially the protocols) supported and used by the corresponding Application Entity over the Mca reference point to this CSE. |

The <Application> resource may contain the attributes listed in Table 2.

TABLE 2

| Attribute Name of <Application> | Multiplicity | RW/RO/WO | Description |
|---|---|---|---|
| resourceType | 1 | RO | RO = Read only/RW = Read Write |
| parentID | 1 | RO | |
| expirationTime | 0 ... 1 | RW | |
| accessRightID | 1 | RW | |
| creationTime | 1 | RW | |
| lastModifiedTime | 1 | RO | |
| labels | 0 ... 1 | RO | |
| name | 1 | RO | The (usually human readable) name of the application, as declared by the application developer (e.g., "HeatingMonitoring") |
| App-ID | 1 | RO | Application Identifier |
| App-Inst-ID | 1 | RO | When the application resource refers to an actual application instance in the executing environment. |
| pointOfAccess | 0 ... n | RW | The list of addresses for communicating with the registered Application Entity over Mca reference point via the transport services provided by Underlying Network (e.g., IP address, FQDN). |
| ontologyRef | 0 ... 1 | RW | A reference (URI) of the ontology used to represent the information that is managed and understood by the application; to be passed to the application |

Another identifier, called "M2M Underlying Network Identifier" may be included in M2M implementations to further facilitate connectivity between nodes and AEs.

One or more Underlying Networks may be available at a Node offering different sets of capabilities (e.g., communication protocol, bandwidth, multimedia, etc.), availability schedules etc. Based on the "policy" information at the Node and the capabilities offered by the Underlying Networks, appropriate Underlying Network can be chosen. This identifier helps in identifying the chosen Underlying Network.

M2M Underlying Network Identifier (M2M-UNet-ID)

M2M Underlying Network Identifier (M2M-UNet-ID) is used by a node for identifying the UNet to be used for communicating with another Node.

One or more UNets may be available at a node offering different sets of capabilities, availability schedules etc. Based on the "policy" information at the node and the capabilities offered by the available UNet, appropriate UNet can be chosen. M2M-UNet-ID helps the Node in identifying the chosen UNet.

M2M-UNet-ID may be a static value and unique within a M2M Service Provider domain. Table 3 below provides additional examples of usage details of this resource identifier.

M2M Identifiers Lifecycle and Characteristics

TABLE 3

| Identifier | Assigned by | Assigned to | Assigned during | Lifetime | Uniqueness | Used during | Remarks |
|---|---|---|---|---|---|---|---|
| CSE Identifier | M2M SP | CSE | During the first M2M service connection unless pre-provisioned | Life of the CSE | Global | Information flows | |
| M2M Node Identifier | M2M SP | M2M Node hosting CSE | Pre-provisioned | Life of the M2M Node | Global | Out of scope | |
| M2M Underlying Network Identifier | M2M SP | Underlying Networks | Pre-provisioned | Life of the Underlying Network | Local to M2M SP domain | UL Network selection | |
| M2M Subscription Identifier | M2M SP | AEs, and one or more CSEs belonging to the same M2M subscriber | At service signup | Life of the Subscription with the MM SP | Global | Charging and Information Recorded Other operations are FFS | Multiple CSEs can be allocated the same M2M Subscription Identifier |

Figure 3:
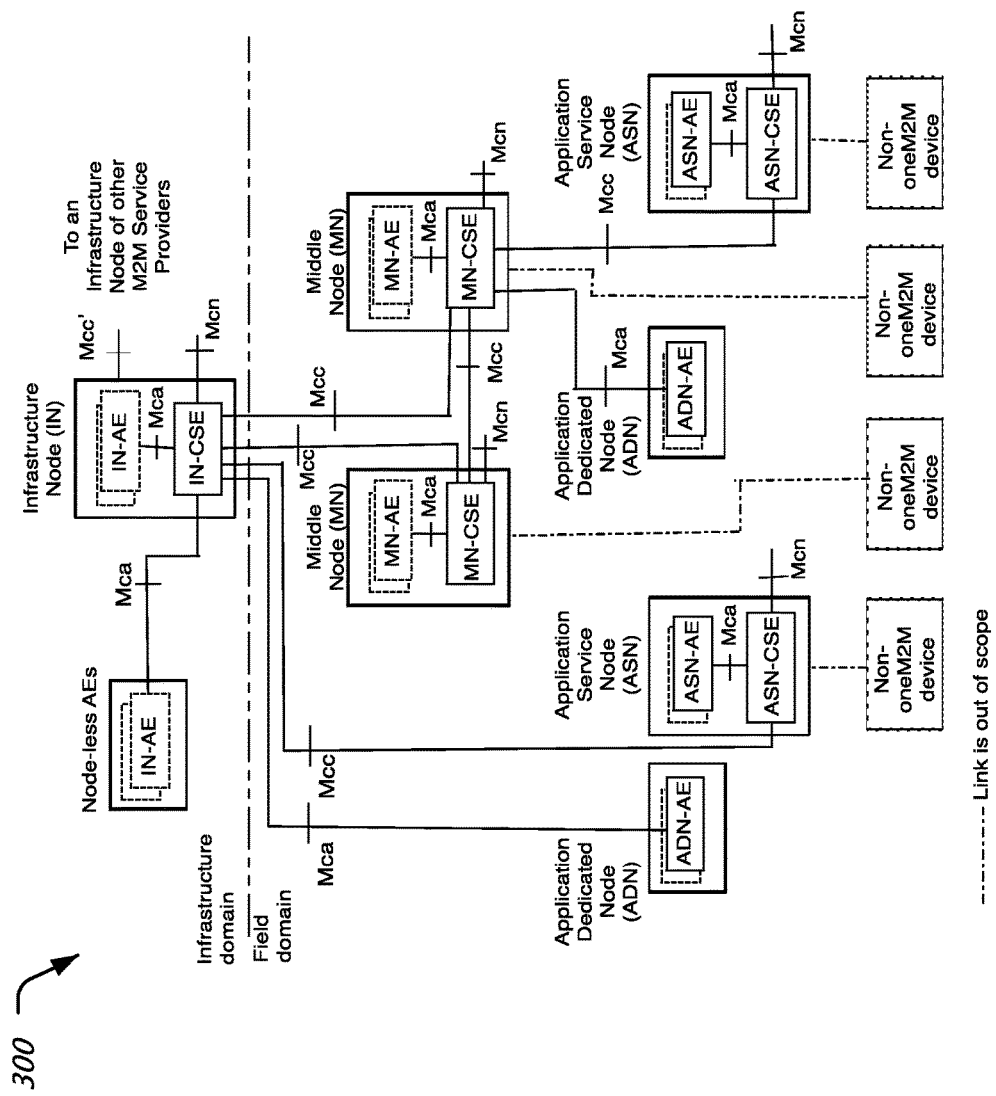
FIG. 3 shows an example or architecture of an M2M communication system.

As one example of implementation, the oneM2M Functional Architecture 300 shown in FIG. 3 supports Application Entities (AEs) on Nodes that provide CSE capability (e.g., ASN, MN, IN), as well as on Nodes that do not provide such CSE capability (e.g., ADNs, Node-less AEs). AEs local on a CSE-capable Node register with the local CSE. AEs on non-CSE-capable Nodes will register with a CSE-capable Node in order to receive services. The CSE-capable Node, in turn, registers with other CSE-capable Nodes, including CSE-capable Infrastructure Node (M2M Server) for communication (services) over Mcc reference point. Such communication can be enabled by the use of "pointOfAccess" attribute in the <remoteCSE> resource structure that is created at the two peer CSE-capable registering Nodes.

For entities/nodes that do not host CSEs (e.g., ADNs, node-less-AEs), registration with a Node that is CSE-capable, results in the creation of another type of resource at the CSE-capable Node. Such resource is called <application> resource. The reachability information for the AE provided in such <application> resource is limited to App-Inst-ID (Application Instance ID) only. In some scenarios, the App-Inst-ID is not sufficient for communication between a CSE and an AE that is located at a remote entity/Node. Stated differently, no "pointOfAccess" information is available for such registering-AE. With such lack of "pointOfAccess," i.e., information about how to access a remotely hosted AE, the remotely hosted AE cannot be reached over Mca reference point.

Another aspect for consideration is that one or more Underlying Networks may be available at a Node (ASN, ADN, MN, IN) offering different sets of capabilities, availability schedules etc. based on the "policy" information at the Node and capabilities offered by the Underlying Networks, appropriate UNet can be chosen. The resource identifier of the underlying network, e.g., M2M Underlying Network Identifier: M2M-UNet-ID, helps in identifying the chosen UNet to the node.

Various embodiments can provide an address, such as IP address, MAC address etc. that is available at the CSE that hosts registration for remotely hosted AE. Any such address can be considered to populate the "pointOfAccess" resource field. Such "pointOfAccess" can be included in the <application> resource for the remotely hosted CSE.

In some embodiments, an identifier, such as M2M-UNet-ID, can be made available at every node that communicates with another node over an UNet. Such identifier will be unique within the domain of the M2M Service Provider.

Example Communication Systems

FIG. 3 illustrates some possible configurations 300 supported by a oneM2M System. This figure is an extract from the Functional Architecture specification being developed by oneM2M.

In this example illustration, Application Entities (AEs) on ADN (ADN-AEs) may register with IN-CSE. Similarly Node-less AEs can register with IN-CSE. ADN-AEs may register with MN-CSE as well. Such registrations are registrations between AEs and CSEs at remote entities/Nodes.

Address, such as the IP address, MAC address etc. is needed at the CSE for communicating with the AEs on the remote entity. Such address is termed as "pointOfAccess" in this document. Such communication may be over Mca reference point via the transport services provided by the Underlying Network that provides connectivity between the remote entities.

In some embodiments, the information about "pointOfAccess" will be usable at the AEs as well.

Figure 5:
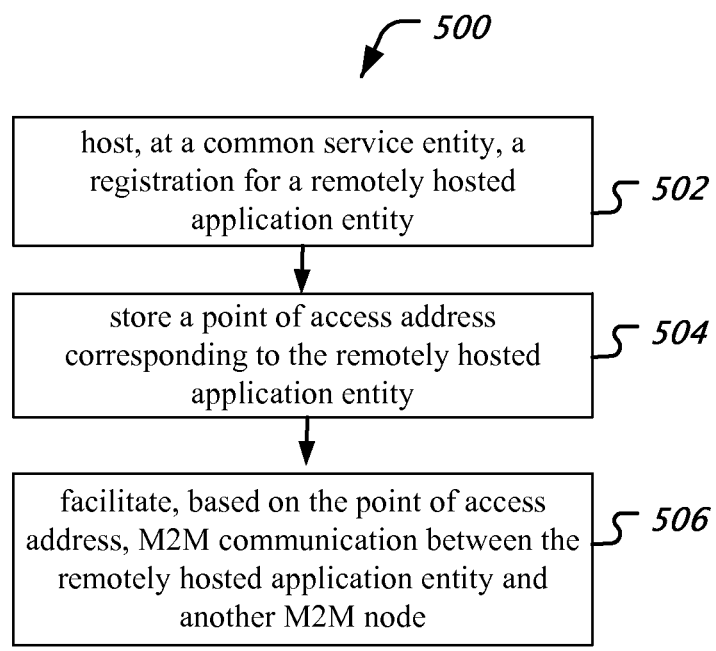
FIG. 5 shows an example flowchart for a method of facilitating M2M communication.

FIG. 5 shows a flowchart example of a method 500 for facilitating Machine-to-Machine (M2M) communication.

The method 500 includes, at 502, hosting, at a CSE, a registration for a remotely hosted application entity, wherein the CSE comprises one or more service functions that are common to multiple M2M services. Some example service functions, e.g., include, data management, device management, M2M subscription management, location services etc.

The method 500 includes, at 504, storing a point of access address corresponding to the remotely hosted application entity, wherein the remotely hosted application entity is on a different hardware platform than that of the CSE. The point of access address may be, e.g., a MAC address or an IP address of the remotely hosted AE. The remotely hosted AE may reside on a different hardware platform and may be reachable from the CSE over a communication network connection.

The method 500 includes, at 506, facilitating, based on the point of access address, M2M communication between the remotely hosted application entity and another M2M node. In some embodiments the point of access address may be an IP address or a MAC address. At 506, the method 500 may further include performing inter-CSE communication using Mcc reference point to facilitate allocation of resources and establishing connectivity between an AE and a requesting M2M node.

A node at which the CSE of method 500 is implemented may receive information about an application resource structure corresponding to the remotely hosted application entity and may extract the point of access address from the application resource structure. The structure may be, e.g., as depicted in FIG. 4.

Figure 6:
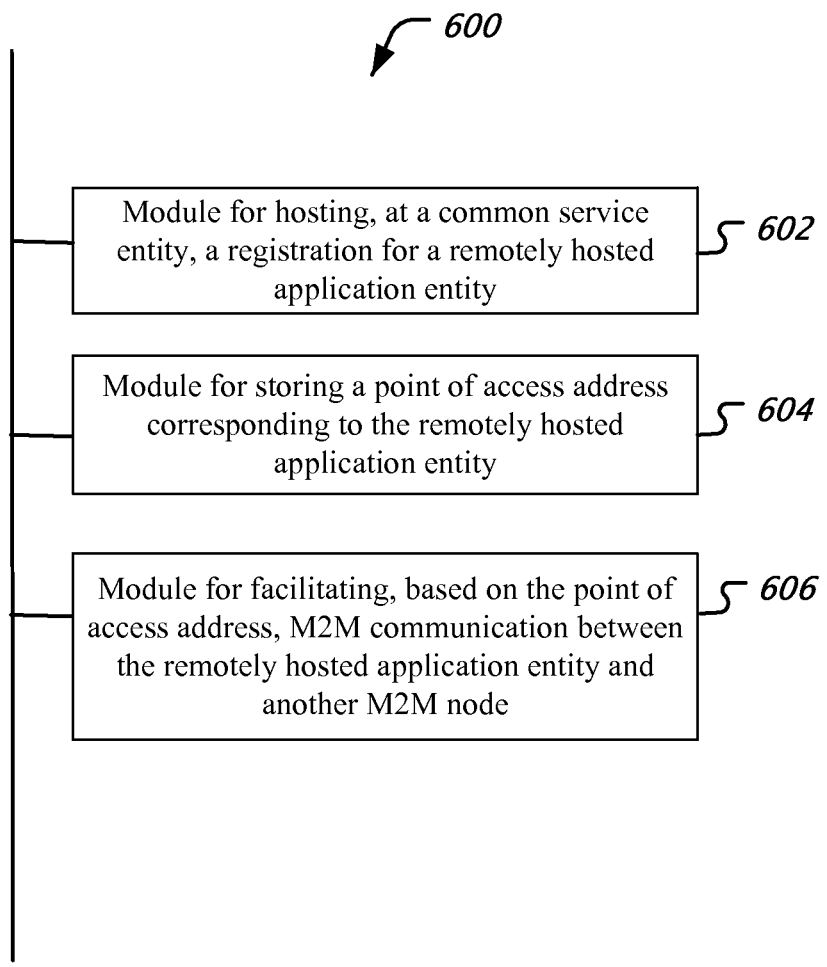
FIG. 6 shows an example block diagram of an apparatus for facilitating M2M communication.

FIG. 6 show an example of an apparatus 600 for facilitating Machine-to-Machine (M2M) communication. The apparatus 600 includes a module 602 for hosting, at a common service entity, a registration for a remotely hosted application entity, a module 604 for storing a point of access address corresponding to the remotely hosted application entity and a module 606 for facilitating, based on the point of access address, M2M communication between the remotely hosted application entity and another M2M node. In some embodiments the point of access address may be an IP address or a MAC address.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for facilitating Machine-to-Machine (M2M) communication, the method comprising:
    hosting, at a common service entity (CSE), a registration for a remotely hosted application entity, wherein the CSE comprises one or more service functions that are common to multiple M2M services;
    creating, by the common service entity, a resource for the remotely hosted application entity upon the registration of the remotely hosted application entity;
    storing, by the common service entity, a point of access address of the remotely hosted application entity in the resource for the remotely hosted application entity such that the remotely hosted application entity is reachable over a reference point between the CSE and the remotely hosted application entity, wherein the remotely hosted application entity is on a different hardware platform than that of the CSE; and facilitating, based on the point of access address, M2M communication between the remotely hosted application entity and an M2M node.

2. The method of claim 1, wherein the point of access address comprises one of an internet protocol (IP) address and a medium access control (MAC) address.

3. The method of claim 1, wherein the remotely hosted application entity resides in an underlying network that is different from that of the CSE.

4. The method of claim 1, wherein the facilitating the M2M communication comprises communicating with another CSE using a pre-defined protocol for inter-CSE communication over an underlying network that is identified.

5. An apparatus for facilitating Machine-to-Machine (M2M) communication comprising:
a module that hosts, at a common service entity, a registration for a remotely hosted application entity;
a module that creates, at the common service entity, a resource for the remotely hosted application entity upon the registration of the remotely hosted application entity;
a module that stores a point of access address of the remotely hosted application entity in the resource for the remotely hosted application entity such that the remotely hosted application entity is reachable over a reference point between the common service entity and the remotely hosted application entity, wherein the remotely hosted application entity is on a different hardware platform than that of the common service entity; and
a module that facilitates, based on the point of access address, M2M communication between the remotely hosted application entity and another M2M node.

6. The apparatus of claim 5, wherein the point of access address comprises an internet protocol (IP) address.

7. The apparatus of claim 5, wherein the point of access address comprises a medium access control (MAC) address.

8. The apparatus of claim 5, wherein the reference point between the common service entity and the remotely hosted application entity includes an Mca interface, and wherein the module that facilitates the M2M communication comprises a module that facilitates the M2M communication over the Mca interface.

9. A computer program product that includes a non-transitory computer-readable medium having code stored thereon, the code, when executed by a processor, causing the processor to implement, a method for facilitating Machine-to-Machine (M2M) communication, the method comprising:
hosting, at a common service entity (CSE), a registration for a remotely hosted application entity, wherein the CSE comprises one or more service functions that are common to multiple M2M services;
creating, by the common service entity, a resource for the remotely hosted application entity upon the registration of the remotely hosted application entity;
storing, by the common service entity, a point of access address of the remotely hosted application entity in the resource for the remotely hosted application entity such that the remotely hosted application entity is reachable over a reference point between the CSE and the remotely hosted application entity, wherein the remotely hosted application entity is on a different hardware platform than that of the CSE; and facilitating, based on the point of access address, M2M communication between the remotely hosted application entity and an M2M node.

10. The computer program product of claim 9, wherein the point of access address comprises one of an internet protocol (IP) address and a medium access control (MAC) address.

11. The computer program product of claim 9, wherein the remotely hosted application entity resides in an underlying network that is different from that of the CSE.

12. The computer program product of claim 9, wherein the facilitating the M2M communication comprises communicating with another CSE using a pre-defined protocol for inter-CSE communication over an underlying network that is identified.

13. A machine to machine communication system comprising a common service entity; a remote application entity;
a module that hosts, at the common service entity, a registration for the remote application entity;
a module that creates, at the common service entity, a resource for the remotely hosted application entity upon the registration of the remotely hosted application entity;
a module that stores a point of access address of the remote application entity in the resource for the remotely hosted application entity such that the remotely hosted application entity is reachable over a reference point between the common service entity and the remotely hosted application entity, wherein the remotely hosted application entity is on a different hardware platform than that of the common service entity; and
a module that facilitates, based on the point of access address, M2M communication between the remote application entity and another M2M node.

14. The machine to machine communication system of claim 13, wherein the point of access address comprises an internet protocol (IP) address.

15. The machine to machine communication system of claim 13, wherein the point of access address comprises a medium access control (MAC) address.

16. The machine to machine communication system of claim 13, wherein the reference point between the common service entity and the remotely hosted application entity is an Mca interface, and wherein the module that facilitates the M2M communication comprises a module that facilitates the M2M communication over the Mca interface.

17. A method for facilitating Machine-to-Machine (M2M) communication comprising:
receiving, at a common service entity (CSE), a resource for a remotely hosted application entity;
extracting a point of access address from the resource for the remotely hosted application entity such that the remotely hosted application entity is reachable over a reference point between the common service entity and the remotely hosted application entity, wherein the remotely hosted application entity is on a different hardware platform than that of the CSE; and
facilitating, based on the point of access address, M2M communication between the remotely hosted application entity and an M2M node.

18. An apparatus for facilitating Machine-to-Machine (M2M) communication comprising:

a receiver configured to receive, at a common service entity (CSE), a resource for a remotely hosted application entity; and a processor configured to read instruction from a non-transitory computer-readable medium and perform:

extracting a point of access address from the resource for the remotely hosted application entity so that the remotely hosted application entity is reachable over a reference point between the common service entity and the remotely hosted application entity, wherein the remotely hosted application entity is on a different hardware platform than that of the CSE; and facilitating, based on the point of access address, M2M communication between the remotely hosted application entity and another M2M node.

* * * * *